United States Patent [19]
Aksyuk et al.

[11] Patent Number: 6,075,239
[45] Date of Patent: Jun. 13, 2000

[54] ARTICLE COMPRISING A LIGHT-ACTUATED MICROMECHANICAL PHOTONIC SWITCH

[75] Inventors: Vladimir A. Aksyuk, Piscataway; David J. Bishop, Summit; Peter L. Gammel, Millburn; C. Randy Giles, Whippany, all of N.J.

[73] Assignee: Lucent Technologies, Inc., Murray Hill, N.J.

[21] Appl. No.: 09/138,686

[22] Filed: Aug. 24, 1998

Related U.S. Application Data

[60] Provisional application No. 60/058,465, Sep. 10, 1997.

[51] Int. Cl.[7] .................................. G02B 6/10; H01J 1/56
[52] U.S. Cl. .................. 250/229; 250/227.11; 385/16
[58] Field of Search .............................. 250/229, 214 R, 250/214 I, 216, 227.11, 227.21, 227.22; 385/16, 17, 18, 19, 20, 21, 22, 23, 24, 25, 47, 50

[56] References Cited

U.S. PATENT DOCUMENTS

| | | | |
|---|---|---|---|
| 5,367,584 | 11/1994 | Ghezzo et al. | 385/17 |
| 5,367,585 | 11/1994 | Ghezzo et al. | 385/23 |
| 5,714,773 | 2/1998 | Burrows et al. | |
| 5,781,331 | 7/1998 | Carr et al. | 359/288 |
| 5,953,469 | 9/1999 | Zhou | 385/22 |

FOREIGN PATENT DOCUMENTS 0 505 655   9/1992   European Pat. Off. .

OTHER PUBLICATIONS

Giles et al., "Microwatt–Power InGaAs Photogenerator for Lightwave Networks," IEEE Photonics Letts., vol. 9, No. 5, May 1997, pp. 666–668.

Lee et al., "Surface–Micromachined Free–Space Fibre–Optic Switches," Elec. Letts., vol. 31, No. 17, Aug. 17, 1995, pp. 1481–1482.

*Primary Examiner*—John R. Lee

[57] ABSTRACT

An article comprising a light-actuated photonic switch is disclosed. The light-actuated photonic switch advantageously includes a photogenerator that powers a microelectromechanical systems (MEMS) switch having very low voltage requirements. The MEMS switch is operable to move a reflector into or out of a path of an optical signal travelling between two waveguides. Since the MEMS switch has such low voltage requirements, a long wave photogenerator, which generates relatively low voltages, can be used. As long wavelength light experiences relatively little attenuation in optical fiber, active lightwave circuits incorporating the present light-actuated photonic switch can have very long fiber runs to remote nodes.

14 Claims, 6 Drawing Sheets

ARTICLE COMPRISING A LIGHT-ACTUATED MICROMECHANICAL PHOTONIC SWITCH

STATEMENT OF RELATED APPLICATIONS

The present application claims priority of Provisional Application No. 60/058,465 filed Sep. 10, 1997 entitled "Micromechanical Photonic Switch."

FIELD OF THE INVENTION

The present invention relates generally to photonic switches, and more particularly to a light-actuated photonic switch and systems incorporating same.

BACKGROUND OF THE INVENTION

"Active" lightwave circuits or networks typically include electrical or electromechanical switches that can cause a change in state in the network. Such a change in state is used, for example, to control information flow throughout the network. The switches used in such circuits require power for actuation, which is typically supplied by external electrical sources over copper wire. Terminals, repeaters and remote node sites in the lightwave circuit must therefore be wired so that power can be delivered to switches resident at such locations.

In many networks, providing electrical service in the aforedescribed manner is impractical or too costly. Moreover, due to the presence of active devices (e.g., the switches), field-deployed active lightwave circuits are likely to experience reliability problems and high maintenance costs. Passive lightwave systems are an alternative; unfortunately, such passive systems tend to incur added complexity at terminal sites to compensate for the limited functionality outside the terminal sites.

Optically-powered circuits can enhance the functionality of an otherwise passive optical system. In such circuits, power is supplied by an optical beam rather than an external electrical source. In some optically-powered circuits, the optical beam powers a photogenerator that produces a current/voltage to drive an electromechanical or electrooptical device. For example, a micro power stepper motor switch powered by an indium gallium arsenide (InGaAs) photogenerator has been remotely actuated through 100 km of transmission fiber. See, Dentai et al., "High-Voltage (2.1V) Integrated InGaAs Photo-generator," v. 33, no. 8, Elect. Lett., pp. 718–19, 1997; and U.S. Pat. No. 5,714,773 to Burrows et al.

The photogenerators used in such lightwave circuits can be categorized by the wavelength of the illuminating beam. Short wave photogenerators are powered by light having a wavelength less than about 950 nanometers (nm), and long wave photogenerators are powered by light having a wavelength greater than about 1200 nm. Short wave photogenerators are capable of generating more current and voltage than long wave photogenerators. To satisfy the non-negligible current and voltage requirements of the electrical and electromechanical devices used in prior art optically-powered circuits, short wave photogenerators are typically used.

Unfortunately, the "short" wavelength light that powers short wave photogenerators is subject to significantly higher attenuation in optical fiber than the "long" wavelength light that powers long wave photogenerators. As a result, a fiber run to a remote node at which a short wave photogenerator and switch are located is typically limited to a significantly shorter length than if a long wave photogenerator was present at the node. To extend the length of the fiber run, a higher power optical beam must be launched into the fiber. Aside from the increased power requirements associated with such a higher power beam, there is an increased likelihood and severity of cross talk between the power beam and the information-carrying optical signals being delivered to the node. In addition to the aforementioned drawbacks, prior art active lightwave circuits typically suffer from a relatively low bandwidth and long switching times.

The art would thus benefit from an optically-powered circuit that uses long wave photogenerators to provide power for actuating switches and the like.

SUMMARY OF THE INVENTION

In one embodiment, an article comprising a light-actuated photonic switch includes a long wave photogenerator that powers a micro-electromechanical systems (MEMS) switch having very low voltage requirements. The MEMS switch incorporates a device that is mechanically linked to an actuator. In one embodiment, the device is a reflector that reflects an optical signal incident thereon. The reflector of the MEMS switch is positioned in a gap that separates source and destination optical fibers or other optical transmission media.

In operation, an optical beam is delivered to the long wave photogenerator. When illuminated, the photogenerator generates a relatively low voltage, which is conducted to the actuator of the MEMS switch. With the application of that low voltage, which is typically less than 5 volts and as low as about 1 volt, the mechanically-linked reflector is moved into the path of an optical signal traveling from the source fiber into the gap. The optical signal contacts the reflector and, in one embodiment, is reflected into the source fiber. In this manner, the optical signal is prevented from crossing the gap to the destination fiber.

Being electrostatically-driven devices, most MEMS switches operate using negligible average current, but non-negligible voltage. The present inventors recognized that if a low-voltage MEMS switch could be developed, it could be powered by a long wave photogenerator, avoiding some of the drawbacks of prior art active lightwave circuits. Such a low-voltage MEMS switch is described herein. Active lightwave circuits utilizing the present light actuated photonic switch may realize an increase in the length of fiber spans to remote nodes of about fifty to one hundred percent over the prior art.

DETAILED DESCRIPTION

Figure 1:
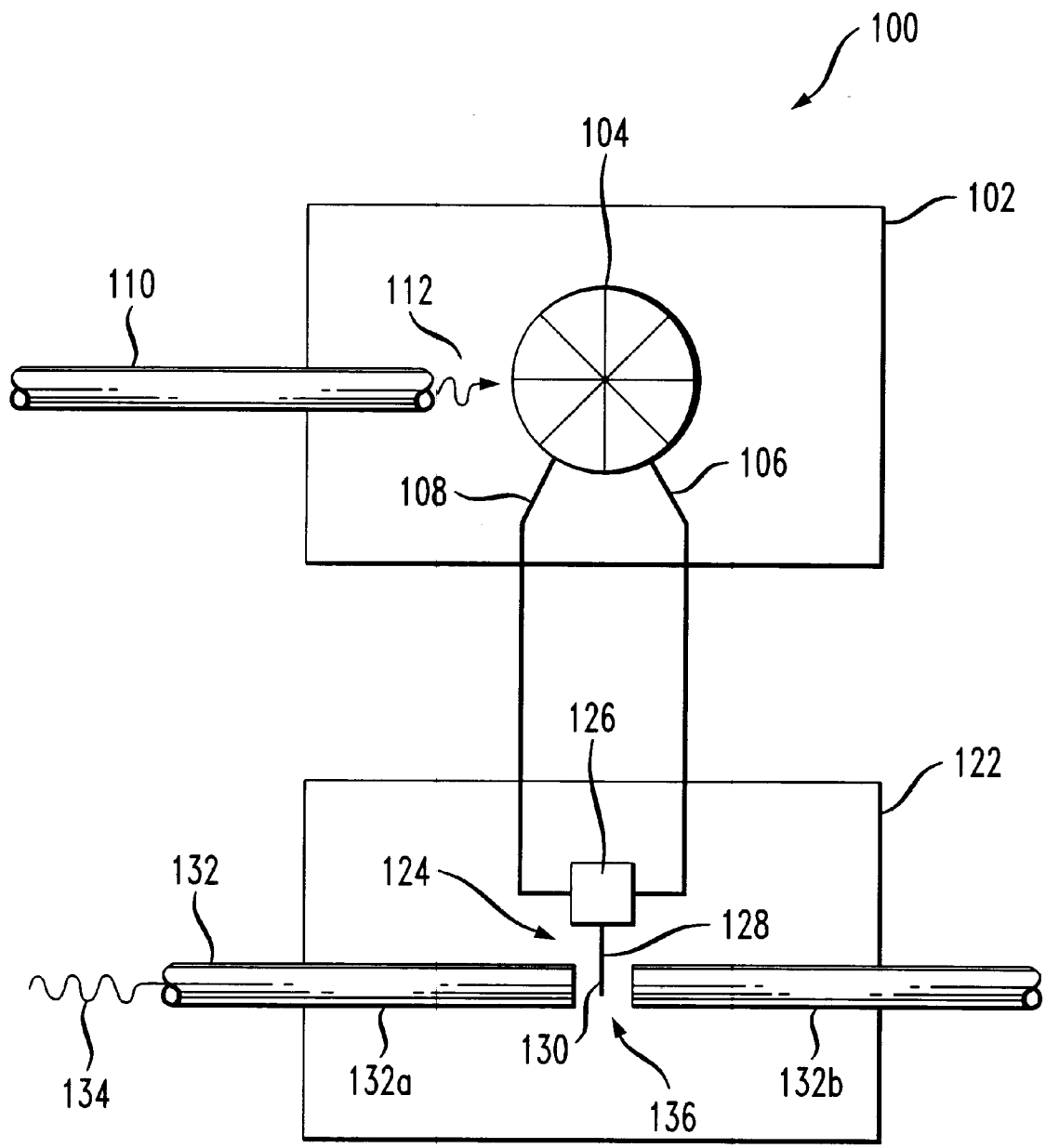
FIG. 1 depicts a schematic of a light-actuated photonic switch in accordance with an illustrative embodiment of the present invention.

FIG. 1 depicts a light-actuated photonic switch 100 in accordance with an illustrative embodiment of the present invention. Switch 100 includes a photogenerator chip 102 having a photogenerator 104, and a switch chip 122 having micro-electromechanical systems (MEMS) structure 124 configured to provide a switching function (hereinafter "MEMS switch"). Photogenerator 104 is advantageously a long wave photogenerator, defined herein as a photogenerator powered by an optical beam having a wavelength greater than about 1200 nm. Photogenerator 104 is electrically connected to MEMS switch 124 via electrical leads 106 and 108. Although photogenerator 104 and the MEMS switch 124 are fabricated on different chips in the illustrated embodiment, it is known in the art how to monolithically integrate those two devices. As such, in an alternative embodiment, the photogenerator and MEMS switch are integrated on a single chip.

MEMS switch 124 is advantageously designed and configured to be actuated by very low voltage, typically about 1 to 5 volts. The benefits of using such a switch have previously been described. Further details of a low-voltage MEMS switch for use in conjunction with the present invention are provided later in this specification in conjunction with FIG. 2.

With continuing reference to FIG. 1, MEMS switch 124 comprises a device 130 that is mechanically linked, via linkage 128, to an actuator 126. Device 130 is disposed in a gap 136 between a source optical transmission media 132a and a destination optical transmission media 132b. As a function of the operation of actuator 126, device 130 is moved into and out of the path of an optical signal 134 exiting source fiber 132a.

The optical transmission media can be any one of a variety of materials suitable for guiding an optical signal, such as, for example, slab waveguides, optical fibers and the like. For ease of exposition, such optical transmission media is hereinafter collectively referred to as a "fiber" or an "optical fiber" in both this Detailed Description and the claims. Gap 136 is sized to receive device 130, but, in the absences of lenses, should be kept relatively small due to the finite divergence of the optical signal as it leaves source fiber 132a. A gap of about 20 microns has been found to be suitable. It will be appreciated that if one or more lenses are disposed within gap 136, the size of the gap will typically be substantially larger.

Device 130 is operable, depending upon application specifics, to affect optical signal 134 such that there will be a measurable difference in a characteristic of that signal across MEMS switch 124. In various embodiments, device 130 is reflective, diffractive, absorptive or otherwise able to alter a characteristic of an optical signal. Several nonlimiting examples of specific implementations of device 130 include a metalized surface, a dielectric mirror, a dielectric filter, a modulator, a polarizer, an attenuator, and a device having a nonlinear optical response, such as a frequency doubler. For ease of exposition, device 130 will be referred to hereinafter as "reflector 130," it being understood that the term "reflector" is not intended to be limited to its dictionary meaning but is used rather as shorthand, in both this Detailed Description and the claims, to reference any of the aforedescribed implementations.

In operation, an optical fiber 110 delivers an optical beam 112 to photogenerator 104. When illuminated by beam 112, photogenerator 104 generates a voltage. The voltage generated by photogenerator 104 is conducted, via electrical leads 106 and 108, to actuator 126 of MEMS structure 124. With the application of that voltage to actuator 124, reflector 130 is moved, via linkage 128, into the path of signal 134 from source fiber 132a. In this manner, optical signal 134 is prevented from crossing gap 136 to destination fiber 132b. In alternate embodiments, optical signal 134 may be partially attenuated by reflector 130, or a characteristic of signal 134 other than signal strength may be altered, depending upon the specific implementation of reflector 130. The operation of the MEMS switch is described in further detail later in this Specification in conjunction with a discussion of FIGS. 4a and 4b.

Figure 2:
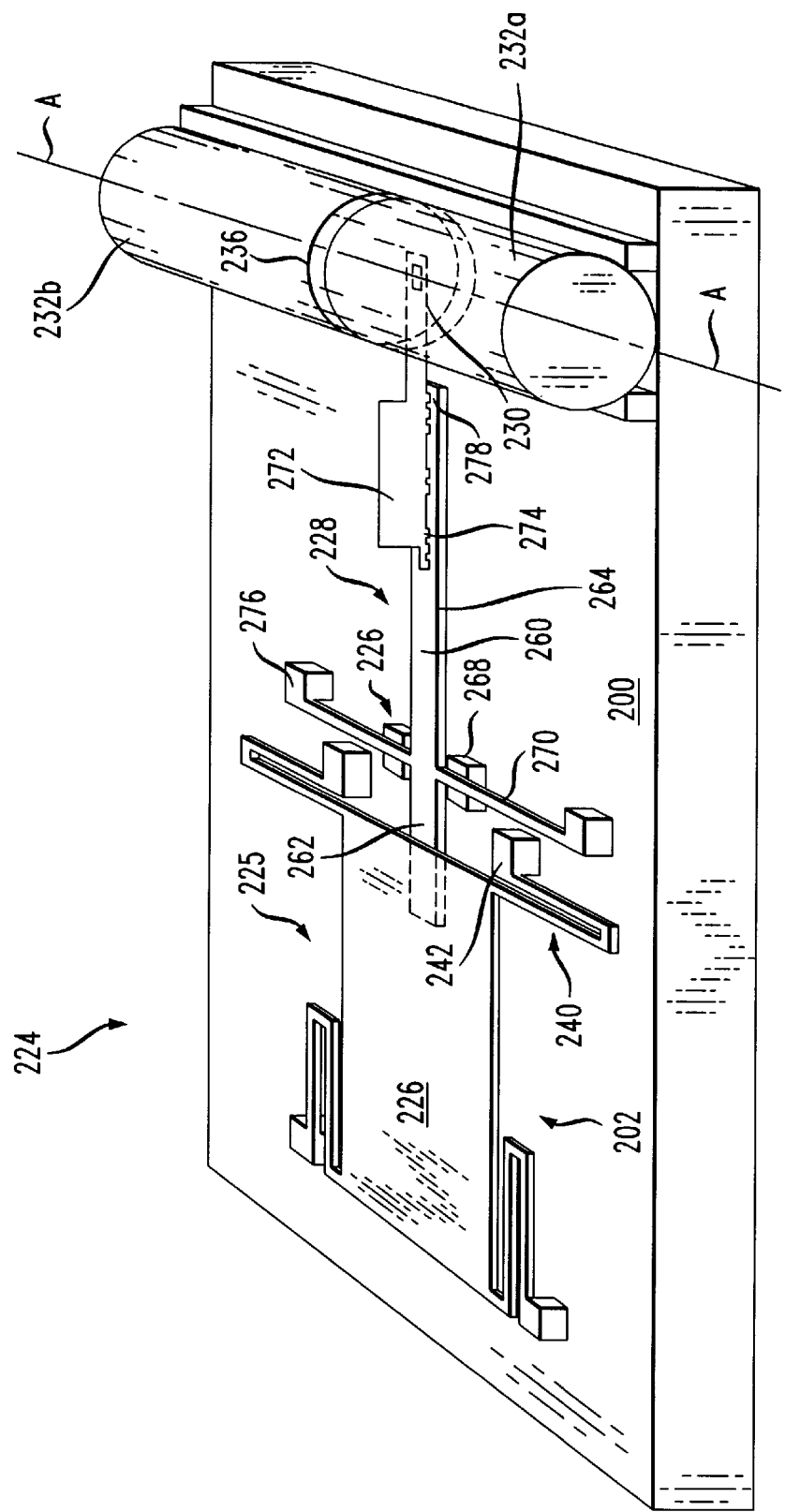
FIG. 2 depicts an illustrative MEMS structure for use in conjunction with the switch of FIG. 1.
Figure 4A:
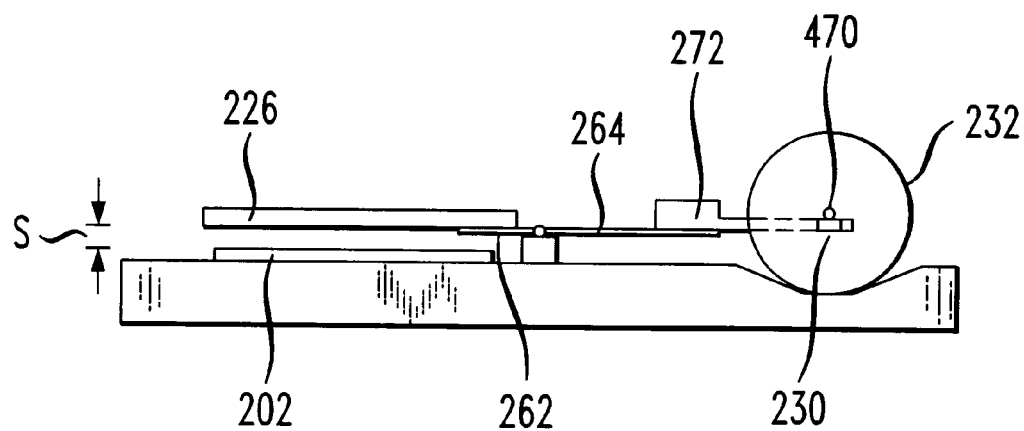
FIG. 4a depicts the MEMS structure of FIG. 2 in a quiescent state.
Figure 4B:
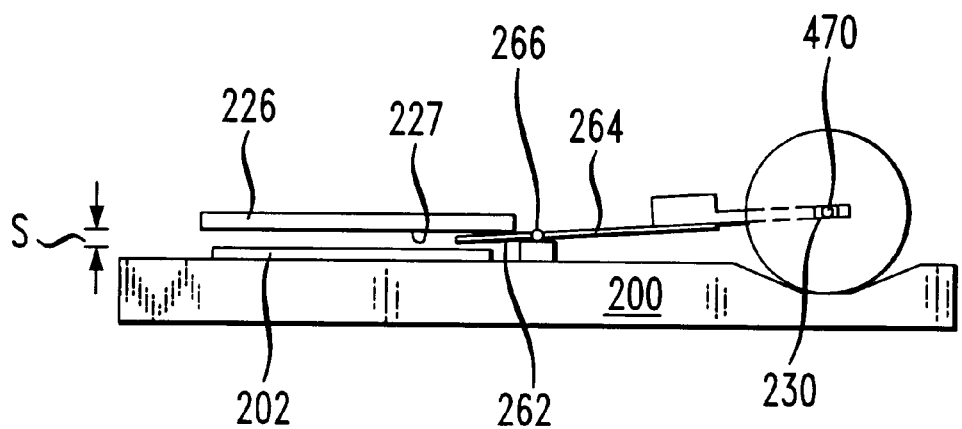
FIG. 4b depicts the MEMS structure of FIG. 2 in an energized or actuated state.

Illustrative MEMS switch 224, depicted in FIG. 2, includes an actuator 225, a linkage 228 and a reflector 230, interrelated as shown. Linkage 228 mechanically connects reflector 230 to actuator 225. Reflector 230 is disposed in gap 236 between source and destination fibers 232a and 232b. When so connected and arranged, actuator 225 is operable to move reflector 230 into and out of optical path A—A of an optical signal delivered by source fiber 232a. If the optical transmission media 232a and 232b are actually optical fibers, as opposed to integrated waveguide structures, such fibers can be aligned, as illustrated in FIG. 2, via guide "rails" that are disposed on the surface of substrate 200. Alternatively, the optical fibers can be aligned using grooves, such as the well-known "v-groove," which is depicted in FIGS. 4a and 4b. After alignment, such optical fibers are typically glued in place.

Referring to FIG. 2, actuator 225 consist of a movable plate 226 that is suspended by suspension elements 240 above an electrode 202 (not shown) located underneath the movable plate. Both movable plate 226 and electrode 202 are conductive. In some embodiments, electrode 202 is formed from a layer of conductive material disposed on substrate 200 beneath movable plate 226. Such an electrode is referred to herein as a "discrete" electrode. In one of such embodiments, the layer of conductive material comprises polysilicon. In some embodiments in which substrate 200 is conductive, the substrate itself serves as electrode 202. Moreover, in still other embodiments, if substrate 200 is non conductive, it can be doped to render it suitably conductive so that it can function as electrode 202. Reference herein to "electrode 202" is intended to encompass any of the aforementioned implementations.

Suspension elements 240 deform to allow movable plate 226 to move towards electrode 202 when an attractive force is developed therebetween. Such an attractive force is developed, for example, by applying a voltage across electrode 202 and movable plate 226. Suspension elements 240 also provide a restoring force to return movable plate 226 back to a neutral or quiescent position when the attractive force subsides.

It will be appreciated that to prevent shorting, movable plate 226 must not contact electrode 202. In one embodiment wherein electrode 202 is a discrete electrode, the electrode has holes patterned in it extending through to an underlying nonconductive layer (e.g., the substrate). Protrusions or spikes depend from the "under surface" of movable plate 226 (i.e., the surface of the movable plate facing underlying electrode 202). Such protrusions extend downwardly a distance from the under surface of movable plate 226. The holes in electrode 202 are aligned to receive the protrusions.

When movable plate 226 moves towards electrode 202 under applied voltage, the holes in electrode 202 receive the protrusions. The protrusions have a diameter appropriate for being received by the holes without contacting the electrode material defining the perimeter of the holes. Moreover, the length of the protrusions is greater than the thickness of electrode 202. Thus, when received by the holes, the protrusions contact the nonconductive layer disposed underneath electrode 202 before the undersurface of movable plate 226 contacts electrode 202. Such contact between the ends of the protrusions and the nonconductive layer stops the downward motion of movable plate 226 before it shorts against electrode 202. Protrusions having a length of about 0.75 microns are suitable for use with an electrode having a thickness of about 0.5 microns.

In embodiments wherein the substrate (doped or undoped) serves as electrode 202, a thin layer of nonconductive material, such as silicon nitride, is advantageously disposed over electrode 202. The nonconductive layer prevents movable plate 226 from contacting electrode 202 as the movable platemoves downwardly under applied voltage.

In the illustrated embodiment, suspension elements 240 are realized as "springs" that depend from supports pads 242. Further detail of the illustrated embodiment of such suspension elements is provided in FIGS. 3a and 3b.

Figure 3A:
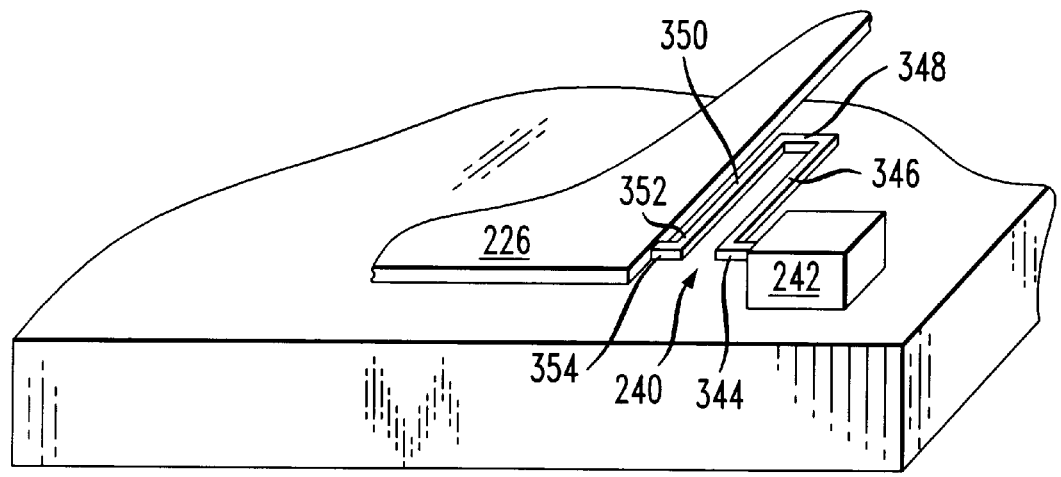
FIG. 3a depicts an illustrative suspension element for use in conjunction with the MEMS structure of FIG. 2.
Figure 3B:
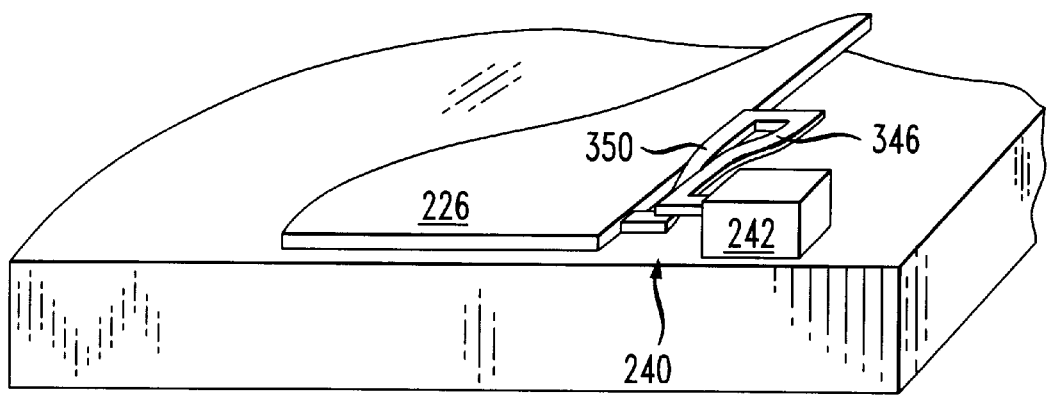
FIG. 3b depicts the suspension element in a deformed state.

As shown in FIG. 3a, suspension elements 240 (one of which is depicted) have an elongated U-shaped configuration (when supported movable plate 226 is in a neutral position). Member 344 depending from first leg 346 of suspension elements 240 is connected to support pad 242. Member 354 depending from first end 352 of second leg 350 is mechanically connected to movable plate 226, shown in partial section. As depicted in FIG. 3b, second leg 350 moves downwardly following the movement of movable plate 226 as the plate is drawn towards underlying electrodes 202 (not shown). Second leg 350 draws first leg 346 downwardly with it. About one half of the distance through which plate 226 drops toward underlying electrodes 202 is accommodated by flexion in second leg 350, and the other half is accommodated by flexion in first leg 346. Energy is stored in suspension element 240 as the legs 350 and 346 move downwardly from their neutral position. Once the attractive force responsible for the movement of plate 226 towards electrodes 202 and away from its neutral position is removed, the energy stored in suspension element 240 is released, returning plate 226, and first and second legs 350 and 346, to their neutral position.

Suspension elements 240 and suspension pads 242 are advantageously electrically conductive or are rendered so, such as by the application of a metal thereto. Other configurations suitable for providing the flexibility and resilience exhibited by the illustrated embodiment of suspension element 240 may suitably used in conjunction with the MEMS switch.

Returning to FIG. 2, linkage 228 comprises beam 260 that rests on fulcrum 266 that allows beam 260 to "teeter" in the manner of a bascule or "see-saw." Fulcrum 266 functionally "divides" beam 260 into two portions: first portion 262 and second portion 264. In the illustrated embodiment, fulcrum 266 is realized by arms 270 that depend from the sides of beam 260. Arms 270 rest on, but are not attached to, fulcrum supports 268. As such, arms 270 are free to pivot or rock such that as first portion 262 of beam 260 is driven downwardly, such as by downward movement of movable plate 226, second portion of beam 260 moves upwardly, away from substrate 200.

Movable plate 226 is returned to a quiescent or neutral position by the restoring force provided by suspension elements 240. Since the weight of beam 260 alone cannot be relied upon to return the beam to its quiescent position (after movable plate 226 returns to its quiescent position), a restoring force must be provided to the beam. In illustrative MEMS switch 224, the restoring force on beam 260 is provide by "torsional" springs. In the illustrative embodiment, such torsional springs are realized by laterally extending arms 270 beyond fulcrum supports 268 and attaching or otherwise fixing such arms to arm supports 276. Since arms 270 are fixed at arm supports 276, the arms will twist, storing energy, as first portion 262 of beam 260 is driven downwardly. In the absence of the actuating force that drives movable plate 226 and first portion 262 of beam 260 downwardly, arms 270 release their stored energy by untwisting and, as a result, beam 260 is returned to its quiescent or neutral position.

In the illustrated embodiment, arms 270 are thus bifunctional; they are pivot elements and also function as torsional springs. In other embodiments, separate elements provide those two functions. For example, in one embodiment (not shown), the arms extend no further than fulcrum supports 268 upon which they rest. When so implemented, the arms function simply as pivots. A separate pair of torsional springs, configured, for example, in the manner of springs 240, are attached to the sides of beam 260 near end 278 of second portion 264 of beam 260.

Reflector support 272, which in illustrative switch 224 is hinged to beam 260, is disposed on second portion 264 of the beam. A portion of reflector support 272, upon which reflector 230 is disposed, extends into gap 236 between first and second portions 232a and 232b of fiber 232. Some of first portion 262 of beam 260 is located beneath and abuts movable plate 226.

Operation of illustrative MEMS switch 224 is described with reference to FIGS. 4a and 4b. FIG. 4a depicts a simplified version of MEMS switch 224 in a neutral or quiescent state. In such a quiescent state, reflector 230 is located off of the optical axis defined by fiber core 470 (i.e., optical axis A—A of FIG. 2), such that it does not intercept an optical signal traveling through the fiber core. FIG. 4b depicts MEMS switch 224 in an actuated state. As voltage is applied across plate 226 and electrode 202, an electrostatic attraction is developed therebetween. Such an attraction causes movable plate 226 to move downwardly towards electrodes 202, decreasing the separation distance S therebetween. First portion 262 of beam 260, which abuts under-surface 227 of movable plate 226, is driven downwardly along with movable plate 226. Due to fulcrum 226, second portion 264 of beam 260 moves upwardly away from substrate 200 in response to the downward movement of first portion 262. The upward movement of second portion 264 of beam 260 moves reflector 230 into the optical axis defined by fiber core 470, thereby intercepting an optical signal traveling therethrough. The location of fulcrum 266 along the length of beam 260 is suitably adjusted to provide a desired amount of vertical movement at the end of second portion 264 of the beam such that reflector 230 intersects the optical axis when actuator 225 is energized.

In the embodiment illustrated in FIG. 4a, reflector 230 is depicted as being located beneath fiber core 470 in the quiescent position, moving into the path of the fiber core upon actuation. In other embodiments, reflector 230 is located in the path of the fiber core 470 in the quiescent position, and moves "above" the fiber core upon actuation.

It was previously noted that MEMS switches for use in conjunction are advantageously actuated by very low voltages to realize the benefits of the present invention. It has been found that with certain modifications to a "standard" MEMS switch design, a switch actuable at very low voltage (and negligible current) can be fabricated. Such modifications are described below.

In a first modification, suspension elements 240 that suspend movable plate 226 must be "soft." As the term is used herein, a "soft" suspension element has a spring constant within the range of about 0.25 to 0.5 Newtons/meter. By contrast, the spring constant for suspension elements used in a typical MEMS device is on the order of about 10 N/m. To fabricate such a "soft" suspension element, the elements are typically lengthened. As a guideline, the spring constant is assumed to be inversely proportional to the third power of the length of the spring element (i.e., $K (1/L^3)$). For a torsional element, the spring constant is assumed to be inversely proportional to the first power of the length of the torsional element (i.e., $K (1/L)$).

In a second modification, the movable plate 226 is advantageously sufficiently large such that substantial flexion occurs during actuation. Regarding such plate flexion, as movable plate 226 is drawn towards electrode 202, it deforms substantially such as voltage is first applied, only a small region of the movable plate (or protrusions depending therefrom) contacts an underlying nonconductive surface. The region that makes such "initial" contact is typically the region of the plate furthest from the suspension elements (and the portion of beam 260 underlying movable layer 226). The contact region "propagates" in a "ziplock"fashion away from the initial contact point. A large electrostatic force of attraction is generated with surprisingly low voltage when such flexion is provided in movable plate 226. Regarding plate size, a movable plate of at least about 300 microns×300 microns×1.5 microns thickness has been found to be adequate in this regard.

Additionally, electrode 202 is advantageously realized using the substrate as the electrode with an overlying layer of silicon nitride. Such an arrangement has been found to typically result in lower actuation voltages than switches using discrete electrodes. Moreover, movable layer 226 advantageously comprises only a single polysilicon layer (the "POLY2" layer of MCNC's three-polysilicon-layer micromachining process described below), while in "standard" (i.e., higher voltage) MEMS switches used in other applications, the movable layer often comprises two layers of polysilicon.

Technology for fabricating a MEMS switch, such as MEMS switch 226 in accordance with the present teachings is available from a variety of sources, such as, for example, the MEMS Microelectronics Center of North Carolina (MCNC). One of the technologies offered by MCNC is a three-polysilicon-layer surface micromachining process. In that process, a silicon wafer is first covered with an insulating silicon nitride layer. Three separate layers of polysilicon, POLY0, POLY1 and POLY2 are then deposited and patterned. A layer of oxide (e.g., phosphosilicate glass "PSG") is sandwiched between the first (POLY0) and second (POLY1) layer, as well as between the POLY1 layer and the uppermost (POLY2) layer. By virtue of the aforementioned sacrificial oxide layers, the POLY1 and POLY2 are "releasable" (by etching away such oxide layers) and so can be used to form mechanical structures. The lowermost POLY0 layer is non-releasable and is used for patterning address electrodes and local wiring on the insulating silicon nitride layer. The polysilicon layers POLY0, POLY1 and POLY2 have nominal thicknesses of 0.5, 2.0 and 1.5 microns, respectively. Optionally, a layer of gold, nominally about 0.5 microns in thickness, can be deposited on the POLY2 layer.

The polysilicon and oxide layers are individually patterned as desired, and unwanted material from each layer is removed by reactive ion etching before the next layer is added. After all layers are patterned, the POLY1 and POLY2 layers are released, as required, using HF to etch away the sacrificial oxide layers. After release, the patterned POLY1 and POLY2 layers are free to move, and assembly, if not accomplished during fabrication steps, can proceed.

During "active" assembly, the various elements of the MEMS device are moved into position after the various elements of the MEMS device are formed. More particularly, various plates are moved from an initial position, typically in the plane of the substrate, to a final and typically out-of-the-substrate-plane position. Plates can be moved into final position with, for example, a micropipette. MEMS device that are actively assembled are typically comprised of at least a few "hinged plates." Such hinged plates are rotatable about their hinge. As formed, such hinged plates lie flat on the surface of the substrate. Assembly typically requires rotating such a plate about its hinges out of the plane of the substrate. Some plates will be rotated by ninety degrees, and others by a lesser amount. Forming such hinged plates is known in the art. See, for example, Pister et al., "Microfabricated Hinges," vol. 33, Sensors and Actuators A, pp. 249–356, 1992. See also, assignee's co-pending patent applications "Micro Machined Optical Switch," filed May 15, 1997 as Ser. No. 08/856,569 and "Methods and Apparatus for Making a Microdevice," filed May 15, 1997 as Ser. No. 08/056,565, both of which applications are incorporated by reference herein.

As an alternative to active assembly, the present MEMS switches can advantageously be "passively" self assembled. In passive assembly, the various elements of the MEMS device are moved into their working positions during the process of fabrication. One way to accomplish such passive assembly is to deposit a layer of material having a high intrinsic stress on top of a polysilicon beam or plate that is supported at only one end (i.e., cantilevered) In the aforedescribed MCNC process, the gold layer optionally deposited on the POLY2 layer can be deposited such that it possesses a high intrinsic stress. For example, in one embodiment, the material serving as an adhesion layer (typically required) between the polysilicon and the gold is chromium. A high intrinsic stress is associated with the chromium layer. When the sacrificial oxide layer is etched away to release the beam or plate, the chromium layer contracts to minimize strain. Upon such contraction, an upwardly-directed force is imparted to the free end of beam or plate, causing it to warp in an "1upwards" direction. Such upward movement can be used to move structures into their working positions. See, for example, assignee's co-pending patent application "Self-Assembling Micro-Mechanical Device," filed Dec. 22, 1997 as Ser. No. 08/997175, which application is incorporated herein by reference.

Figure 5:
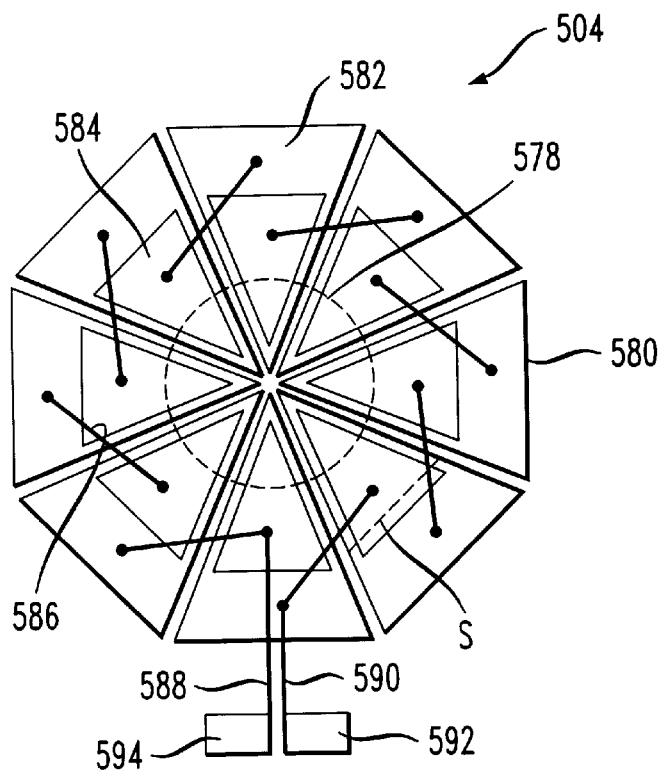
FIG. 5 depicts an illustrative photogenerator for use in conjunction with the switch of FIG. 1.

Referring again to FIG. 1, the voltage that drives actuator 126 of MEMS switch 124 is generated by photogenerator 104. An illustrative embodiment of a photogenerator 504 suitable for use in conjunction with the present invention is depicted in FIG. 5.

Illustrative photogenerator 504 is a diode array consisting of eight long wavelength diodes 506 connected in series. Diode arrays consisting of a greater or lesser number of diodes may suitably be used, and, for a given illumination power, will generate a correspondingly greater or lesser voltage than photogenerator 504. In some embodiments, the diode array has a circular geometry that provides a high fill factor and is complementary in shape to beam spot 578, which provides the illumination that powers photogenerator 504.

The perimeter of photogenerator 504 defines a polygon, wherein the base of each of the larger triangularly-shaped regions 582 defines a segment of the polygon. Larger triangularly-shaped regions 582 are of one conductivity type (e.g., "n"), and smaller triangularly-shaped regions 584 are of the other (e.g., "p"). Smaller triangularly-shaped regions 584 are the p-i-n junction regions of each diode 580.

As previously indicated, diodes 580 of the array are serially connected. This is effected by electrical interconnections 586 that connect the n region of one diode to the p region of a first adjacent diode, and connect the p region of the one diode to the n region of a second adjacent diode. Electrical connections 588 and 590 deliver the voltage generated by photogenerator 504 to contact pads 592 and 594. Electrical interconnections (not shown in FIG. 5; shown as interconnections 108 and 106 in FIG. 1) electrically connect the photogenerator to the MEMS switch.

Figure 6:
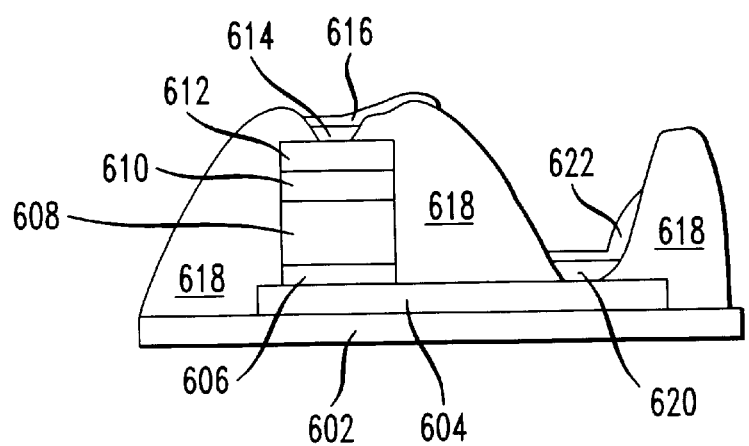
FIG. 6 depicts a cross section of the illustrative photogenerator of FIG. 5.

FIG. 6 depicts a cross section through one of the p-i-n photodiodes of photogenerator 504 through the section line designated "S" in FIG. 5. In the illustrated embodiment, the photodiode comprises five layers, patterned as depicted, that are deposited on a substrate 602. Substrate 602 is an insulating or semi-insulating material, such as iron-doped indium phosphide (InP).

In one embodiment, the photodiode has the following structure. The first deposited layer 604 is the n-layer of the p-i-n structure and consists of silicon-doped InGaAs. Layer 606 is a "stop etch" layer, such as, for example, undoped InP. Layer 608 is an absorbing layer and consists of intrinsic InGaAs. P-layer 610, comprising zinc-doped InP, must be substantially transparent at the operating wavelength of the device, typically 1.3 to 1.55 microns. P+ contact layer 612 is zinc-doped InGaAs. An insulator, such as polyimide, surrounds the layers 604–612. Region 616 is an interconnect, typically gold, to the adjacent n-contact (see FIG. 5), and region 614 is a p contact metal to improve contact with p+ contact layer 612. Region 620 is a n-contact metal to improve contact with n-layer 604. Region 622 is an interconnect, typically gold, to the adjacent p-contact (see FIG. 5).

Further description of a photodiode array suitable for use in conjunction with the present invention is provided in U.S. Pat. No. 5,714,773 by Burrows et al. entitled "Photodiode Array for Remotely Powered Lightwave Networks," issued Feb. 3, 1998, and incorporated by reference herein.

In further embodiments of the present invention, improved lightwave systems and networks incorporate the aforedescribed light-actuated micromechanical photonic switch. Two of such illustrative systems are described below.

Figure 7:
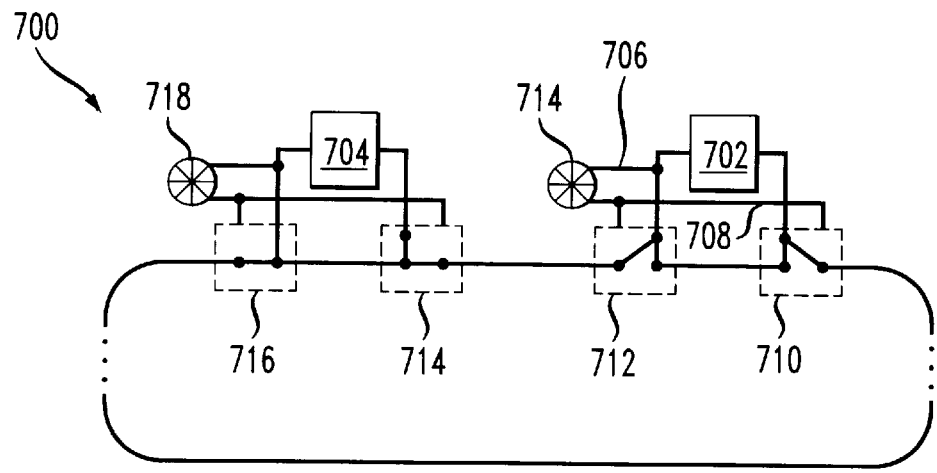
FIG. 7 depicts a ring network in accordance with an illustrative embodiment of the invention incorporating light-actuated photonic switches as a failsafe.

FIG. 7 depicts an improved ring network 700 in accordance with an illustrative embodiment of the invention. Ring network 700 includes a plurality of nodes, two of which, nodes 702 and 704, are shown. It is a property of a ring network that if one node within the network goes "off-line," the whole network goes off-line, unless the off-line node can be bypassed. As such, ring network designs typically have failsafe provisions that allow a node to be bypassed. The present light-actuated micromechanical photonic switch can be used to implement such a failsafe.

A light-actuated micromechanical photonic switch is provided at each node within the network.

The switches for the nodes 702 and 704 are depicted in FIG. 7. The light actuated micromechanical photonic switch at node 702 comprises MEMS switches 710 and 712 and photogenerator 714. The light-actuated micromechanical photonic switch at node 704 comprises MEMS switches 714 and 716 and photogenerator 718.

When a node, such as node 702, is on-line, an optical signal is sent over fiber 706 to power photogenerator 714. The photogenerator generates a voltage that is delivered, over electrical interconnection 708, to MEMS switches 710 and 712. The MEMS switches, such as switches 710 and 712, are configured such that when they are energized or actuated by the voltage generated by photogenerator 714, node 702 is in optical communication with the ring.

When a node, such as node 704, is off-line, its associated photogenerator no longer receives the optical power signal. Consequently, electrical output from photogenerator 718 ceases. In the absence of an actuating voltage, the MEMS switches, such as switches 714 and 716, are configured such that connection to associated node (i.e., node 704) fails, and the node is bypassed.

Figure 8:
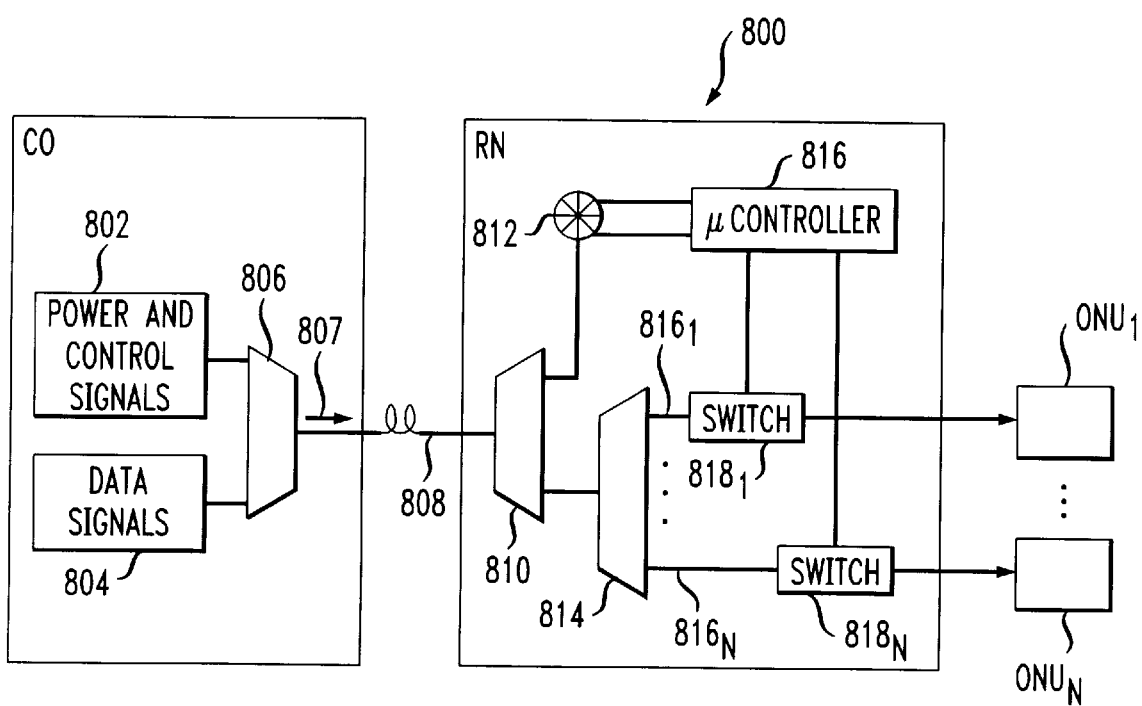
FIG. 8 depicts a passive optical network in accordance with an illustrative embodiment of the invention incorporating light-actuated photonic switches for controlling data delivery to a plurality of optical network units.

FIG. 8 depicts a passive optical network 800 in accordance with an illustrative embodiment of the invention incorporating light-actuated micromechanical photonic switches for controlling data delivery to a plurality of optical network units.

An optical beam for powering photogenerator 812, and an optical control signal for controlling controller 816, collectively identified as signal 802, are multiplexed with a data signal 804 in multiplexer 806 at central office CO. Data signal 804 is a wavelength-division-multiplexed (WDM) signal having data intended for a plurality of optical network units $ONU_1 \ldots ONU_N$, (e.g., homes, businesses, etc.) modulated onto a plurality of spectral components (i.e., wavelengths) comprising the WDM signal.

Multiplexed signal 807 from multiplexer 806 is carried over fiber 808 to remote node RN. Fiber 808 could be a very long run, as much as about 200 km, assuming a 100 mW (20 dBm), 1550 nm light source and 0.25 dB/km fiber loss.

At remote node RN, the optical power and control signals are demultiplexed from the data signals and delivered to photogenerator 812. In response, photogenerator 812 generates a voltage, which is delivered to controller 816. The data signal is demultiplexed in demultiplexer 814 into a number, N, of data signals $816_1 \ldots 816_N$ intended for optical network units $ONU_1 \ldots ONU_N$. MEMS switches $818_1 \ldots 818_N$, actuated according to the control signal being processed by controller 816, control the information signal flow to each optical network unit.

It will be appreciated that a passive optical network, such as the network 800, can be configured in a variety of ways. For example, rather than using a single photogenerator 812 and a controller 816, a plurality of light-actuated photonic switches can be substituted therefor, such that a different photogenerator is associated with each of the MEMS switches $818_1 \ldots 818_N$. Such an embodiment avoids using controller 816. Moreover, modulation can be used, as appropriate, instead of multiplexing.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. It is therefore intended that such other arrangements be included within the scope of the following claims and their equivalents.

We claim:

1. An article including a light-actuated micromechanical photonic switch (LAMPS), said switch comprising:
   a photogenerator that generates a voltage when illuminated by an optical beam; and
   a first micro electromechanical systems (MEMS) device operable to provide a switching function, said MEMS device being electrically connected to the photogenerator and comprising:
   an actuator including a movable plate disposed in spaced and superposed relation to a fixed electrode, said actuator being actuated by applying the voltage generated by the photogenerator to the movable plate and the fixed electrode;
   a reflector operable to affect a characteristic of an optical signal incident thereon; and
   a linkage mechanically connecting the actuator to the reflector, wherein,
   when the actuator is actuated, the reflector is moved causing a change in state of the light-actuated photonic switch.

2. The article of claim 1, wherein the voltage is less than about 5 volts.

3. The article of claim 2, wherein the photogenerator comprises a plurality of series-connected photodiodes operable to generate a voltage when exposed to light having a wavelength greater than about 1200 nanometers.

4. The article of claim 3, wherein the photodiodes comprising the photogenerator are arranged in a circular geometry.

5. The article of claim 4, wherein the movable plate is supported by resilient springs having a spring constant less than about 0.5 Newtons per meter.

6. The article of claim 1, wherein the linkage is a beam, and further wherein the beam is functionally separated into a first and a second portion by a fulcrum, wherein part of the first portion of the beam underlies and abuts the movable plate, and further wherein the reflector is mechanically connected to the second portion of the beam and disposed between two optical fibers.

7. The article of claim 6, wherein the fulcrum comprises arms depending from sides of the beam, and fulcrum supports upon which said arms freely rest.

8. The article of claim 7, further comprising a torsional spring for providing a restoring force to the beam.

9. The article of claim 8, wherein the torsional spring comprises said arms depending from sides of the beam, wherein the arms extend laterally beyond the fulcrum supports and are fixed to arm supports.

10. The article of claim 1, said LAMPS further comprising a second MEMS device operable to provide a switching function, wherein said second MEMS device is electrically connected to said photogenerator, and further wherein when said second MEMS device is actuated, said MEMS device causes a change in state of said LAMPS.

11. The article of claim 10, wherein the article is a network comprising a plurality of optically-communication nodes arranged in a ring architecture, each of said nodes comprising at least one of said LAMPS, wherein, each said LAMPS is operatively connected to its respective node such that:
   in a first state of the network, a portion of light traveling through each node powers the photogenerator of the LAMPS associated therewith, thereby actuating the associated first and second MEMS devices, which devices are configured, in the actuated state, to receive the light and direct it to the associated node, and
   in a second state of the network, the portion of light travelling through at least one of said nodes is not available to power the photogenerator of the LAMPS associated therewith, so that, the associated MEMS devices at the un-powered node remain unactuated, in which unactuated condition said two MEMS devices receive the light intended for said un-powered node and cause said light to bypass said un-powered node.

12. The article of claim 1, said LAMPS further comprising:
   a controller electrically connected to said photogenerator; and
   additional MEMS devices operable to provide a switching function, wherein:
   said additional MEMS devices and said first MEMS device collectively define a plurality of MEMS devices;
   said plurality of MEMS devices are electrically connected to said controller; and
   said controller is operable to actuate, on a selective basis, one or more of said plurality of MEMS devices responsive to a signal generated by said photogenerator.

13. The article of claim 12, wherein the article is a passive optical network comprising:
   a central office at which an optical beam, an optical control signal and a multiplexed optical data signal are multiplexed into a multiplexed optical signal;
   a remote node comprising:
   a first demultiplexer for demultiplexing said optical beam and said optical control signal from said multiplexed optical data signal;
   a second demultiplexer that receives the multiplexed optical data signal from the first demultiplexer and further demultiplexes into a plurality of data signals that are each characterized by a unique wavelength; and
   said LAMPS;
   wherein each demultiplexed data signal is in optical communication with a different one of said plurality of MEMS devices;
   and wherein said photogenerator is operative to:
   receive and be illuminated by said demultiplexed optical beam and optical control signal from said first demultiplexer; and
   generate a voltage signal in response to such illumination, said voltage signal suitable for causing said controller to selectively actuate said plurality of MEMS switches, thereby controlling delivery of data signals.

14. The article of claim 13, wherein said MEMS switches are optically connected to optical network units.

* * * * *